(12) United States Patent
Elsässer et al.

(10) Patent No.: US 7,789,064 B2
(45) Date of Patent: Sep. 7, 2010

(54) PISTON ENGINE

(75) Inventors: Alfred Elsässer, Keltern (DE); Rainer Otto, Erfurt (DE)

(73) Assignee: MAHLE International GmbH, Stuttgart (DE)

( * ) Notice: Subject to any disclaimer, the term of this patent is extended or adjusted under 35 U.S.C. 154(b) by 645 days.

(21) Appl. No.: 11/796,071

(22) Filed: Apr. 26, 2007

(65) Prior Publication Data

US 2007/0251495 A1    Nov. 1, 2007

(30) Foreign Application Priority Data

Apr. 27, 2006    (DE) .................... 10 2006 020 258

(51) Int. Cl.
 *F02B 31/00* (2006.01)
(52) U.S. Cl. ...................... 123/306; 123/308
(58) Field of Classification Search .............. 123/306, 123/308
 See application file for complete search history.

(56) References Cited

U.S. PATENT DOCUMENTS

| | | | |
|---|---|---|---|
| 4,488,531 A | 12/1984 | Tadokoro et al. | |
| 4,612,903 A | 9/1986 | Urabe et al. | |
| 6,742,495 B2 * | 6/2004 | Ashida et al. ............. | 123/310 |

FOREIGN PATENT DOCUMENTS

| | | |
|---|---|---|
| DE | 32 12 910 | 11/1982 |
| DE | 35 14 327 | 10/1985 |
| DE | 34 34 476 A1 | 2/1986 |
| GB | 2 087 975 | 6/1982 |
| JP | 62291434 A * | 12/1987 |
| JP | 2003003855 A * | 1/2003 |

OTHER PUBLICATIONS

Pischinger, Prof. Dr.-Ing. Stefan, *Variable Ventilsteuerung II* ("Variable Valve Control II"), Expert Publishers, pp. 244-260. (Spec, p. 2).

* cited by examiner

*Primary Examiner*—Noah Kamen
(74) *Attorney, Agent, or Firm*—Collard & Roe, P.C.

(57) ABSTRACT

A piston engine (10), in particular in a motor vehicle, has a plurality of cylinders (3) whose combustion chambers (4) are connected to a fresh gas system (5). The fresh gas system (5) has two gas paths, namely a full-load path (9) and a partial-load path (10), for at least one of the cylinders (3), through which the fresh gas (6) can be supplied to the respective combustion chamber (4). To this end, a valve arrangement (11) at the intake end is provided for controlling the fresh gas stream through the gas paths (9, 10) into the respective combustion chamber (4). For actuation of the valve arrangement (11), a control unit (13) is provided, the control unit being designed so that it permanently blocks the full-load path (9) through appropriate control of the valve arrangement (11) at partial load and actuates the partial-load path (10) for controlling the fresh gas stream and through appropriate control of the valve arrangement (11) at full load, it actuates at least the full-load path (9) for controlling the fresh gas stream.

6 Claims, 2 Drawing Sheets

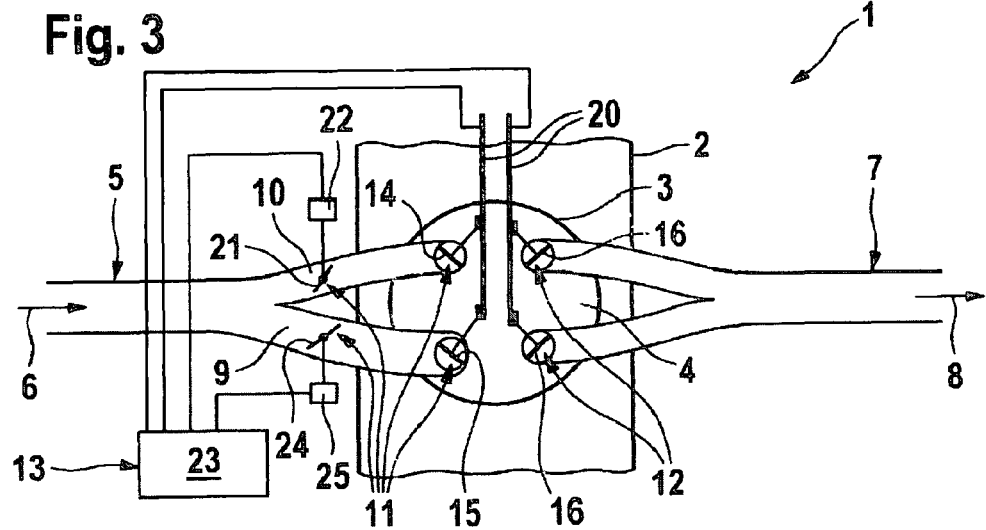
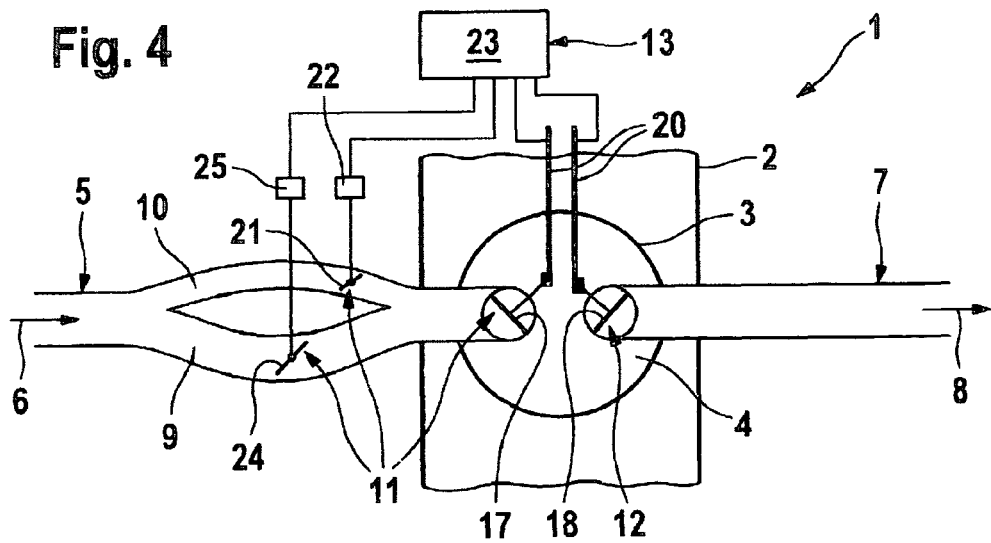

PISTON ENGINE

CROSS REFERENCE TO RELATED APPLICATIONS

Applicants claim priority under 35 U.S.C. §119 of German Application No. 10 2006 020 258.9 filed Apr. 27, 2006.

BACKGROUND OF THE INVENTION

1. Field of the Invention

The present invention relates to a piston engine, in particular in a motor vehicle.

2. Description of the Related Art

A piston engine usually has several cylinders, their combustion chambers being connected at the input end to a fresh gas system and at the output end to an exhaust system. The fresh gas system for each cylinder usually comprises a separate gas path for each over which fresh gas can be supplied to the respective combustion chamber. The fresh gas system is designed with dimensions so that a fresh gas stream can be supplied to the cylinders as is needed in full-load operation of the piston engine. At partial load, the quantity of fresh gas supplied to the combustion chambers must be reduced. It is customary here to throttle the fresh gas system, i.e., provide it with an adjustable throttle mechanism, in particular a throttle valve with which the fresh gas stream supplied to the individual gas paths can be throttled as needed. One disadvantage of throttle fresh gas systems is that the respective throttle mechanism used also forms a flow resistance at full load and allows only relatively small flow velocities at partial load. Fluid-dynamic effects at low flow rates in the fresh gas stream cannot be utilized or can be utilized only inadequately in charging the combustion chambers. Such fluid-dynamic effects, e.g., spiral flow and tumble flow can be utilized to improve the combustion process in modern piston engines in order to reduce fuel consumption and pollution emissions. Since piston engines are operated mostly at partial load and only comparatively rarely at full load, the greatest potential for reducing fuel consumption and pollution emissions is in the partial load range. Therefore there is the desire to utilize fluid-dynamic effects in the partial load range of operation as well to reduce fuel consumption and pollution emissions.

Pischinger, Variable Valve Control II, Expert Publishers, pages 244 through 260 states that the fresh gas system in a piston engine should be dethrottled and/or designed to be throttle-free upstream from intake valves, i.e., the fresh gas system does not contain any special throttle mechanism for throttling the fresh gas stream. For implementation of the fresh gas charging, which depends on the particular load state of the piston engine, there is a known variable valve control which makes it possible to adapt the opening times and closing times of the intake valves in a suitable manner. During the intake stroke of the respective piston, the variable valve control may also implement two charging phases with an interval of time between them. It is likewise possible to vary the opening stroke of the intake valves. To implement these versatile possibilities of variation, the known piston engine works with an electromagnetic valve control that makes it possible to arbitrarily open and close the intake valves and arbitrarily alter their opening stroke. However, such electromagnetic valve controls are much more expensive than traditional valve drives controlled by camshaft.

SUMMARY OF THE INVENTION

The present invention relates to the problem of providing an improved embodiment for a piston engine of the type defined above, which is characterized by an improved combustion process, especially in partial-load operation.

This problem is solved according to this invention by the subject of the independent claim. Advantageous embodiments are the subject of the dependent claims.

The invention is based on the general idea of designing the fresh gas system so that it has two gas paths for at least one cylinder, but preferably for each cylinder, namely a full-load path and a partial-load path. In addition, according to this invention, the piston engine is equipped with a valve arrangement on the intake end and with a respective control unit, where the control unit permanently blocks the full-load path through appropriate control of the valve arrangement at partial load and operates the partial-load path for controlling the required fresh gas stream. Due to this design, only the respective partial-load path is active during partial-load operation, while the respective full-load path is deactivated. With a corresponding cross section of the partial-load path through which the flow can pass, relatively high flow rates can thus be achieved even in partial-load operation. In this way, fluid-dynamic effects can be utilized to improve the combustion process. The full-load path is then available for full-load operation. Depending on the design, the full-load path can be simply activated for full-load operation so that the required quantity of fresh gas is supplied through the two gas paths. It is likewise possible to implement the fresh gas supply exclusively via the full-load path during full-load operation. At least in the last case, the full-load path has a larger cross section through which the flow can pass than does the partial-load path.

The valve arrangement at the intake end can be implemented in a variety of ways. For example, an embodiment with arbitrarily controllable intake valves for both gas paths is conceivable. Alternatively, it is possible to allocate an arbitrarily controllable intake valve only to the full-load path, whereas an inexpensive intake valve, e.g., a camshaft-controlled intake valve, may be allocated to the partial-load path, and upstream from that, an arbitrarily controllable additional valve may be allocated to it. In addition, an embodiment is conceivable, in which a traditional intake valve, e.g., a camshaft-controlled intake valve and, upstream therefrom, an arbitrarily controllable additional valve are controlled in both gas paths. It is especially important that the additional valves may be designed to be especially simple and comparatively inexpensive because they need essentially to be adjustable only between an open position and a closed position because no intermediate positions are necessary.

An embodiment in which the fresh gas system is designed to be unthrottled and/or throttle-free is especially advantageous. The dethrottled fresh gas system improves the combustion process with regard to fuel consumption and pollution emissions, at least in the partial load range. The required quantity of fresh gas is regulated at partial load via a corresponding control of the partial-load path, i.e., by operating the intake valve and/or the additional valve allocated to the partial-load path. At full load, activate regulation of the fresh gas quantity is not usually necessary because the valve arrangement is then controlled and/or set for supplying the maximum possible quantity of fresh gas.

Other important features and advantage of the invention are derived from the subclaims, the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the invention are illustrated in the drawings and explained in greater detail in the following description, where the same reference numerals are used to refer to the same or similar or functionally identical components.

They show, each in schematic diagrams

BRIEF DESCRIPTION OF THE DRAWINGS

FIG. 3 is a highly simplified basic diagram resembling a wiring diagram of a partial area of a third embodiment of a piston engine.

FIG. 4 is a highly simplified basic diagram resembling a wiring diagram of a partial area of a fourth embodiment of a piston engine.

DETAILED DESCRIPTION OF PREFERRED EMBODIMENTS

Figure 1:
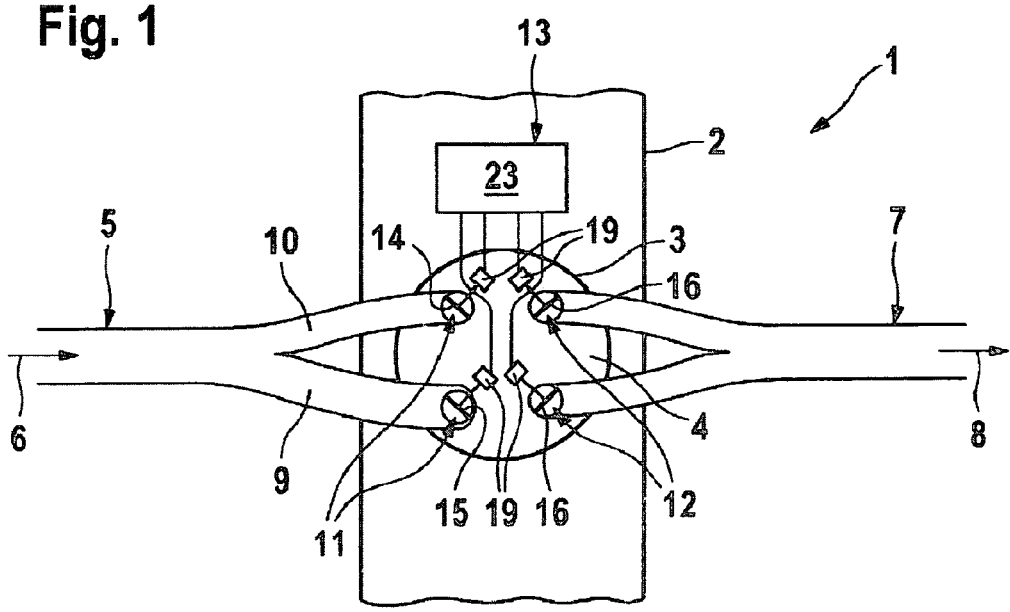
FIG. 1 is a highly simplified basic diagram resembling a wiring diagram of a partial area of a first embodiment of a piston engine.

According to FIGS. 1 through 4, a piston engine 1, which is shown only partially and may be arranged in a motor vehicle in particular comprises several cylinders 3 in an engine block 2 but only one cylinder is shown here. Each cylinder 3 surrounds a combustion chamber 4 in which the actual combustion process takes place. In addition, a piston (not shown) having an adjustable lift is mounted in each cylinder 3, varying the volume of the combustion chamber through its lift in a known manner. The combustion chambers 4 are connected to a fresh gas system 5 of the piston engine 1, supplying fresh gas to the individual combustion chambers 4 according to an arrow 6 during operation of the piston engine 1. In addition, an exhaust system 7 of the piston engine 1 is connected to each combustion chamber 4, removing combustion exhaust gases according to the arrow 8 during operation of the piston engine 1.

The fresh gas system 5 has two separate gas paths, namely a full-load path 9 and a partial-load path 10, at least for the cylinder 3 shown here, but preferably for all cylinders 3 of the piston engine 1. Fresh gas 6 can be supplied to the respective combustion chamber 4 through these two gas paths 9, 10. In the embodiments shown here, the respective full-load path 9 is provided with a larger cross section through the flow can pass than is the partial-load path 10. Essentially however an embodiment with flow cross sections of each size is also possible.

The piston engine 1 is equipped with a valve arrangement 11 on the intake end and with a valve arrangement 12 on the outlet end for controlling the charge change in the respective cylinders 3. Whereas the valve arrangement 11 on the intake end controls the fresh gas stream through the gas paths 9, 10 into the respective combustion chamber 4, the valve arrangement 12 on the outlet end controls the exhaust flow carried out of the respective combustion chamber 4. In addition, a control unit 13 is also provided, having a controller 23, for example, with which the valve arrangement 11 on the intake end can be operated.

This control unit 13 and/or the controller 23 is/are designed so that at partial load of the piston engine, the valve arrangement 11 on the intake end is controlled so that the full-load path 9 is permanently blocked while the valve arrangement 11 on the intake end is controlled with regard to the partial-load path 10, such that the partial-load path 10 is activated and/or operated for controlling the required fresh gas stream. In contrast with that, the control unit 13 and/or the controller 23 is designed for full-load operation of the piston engine 1, so that through appropriate controlling of the valve arrangement 11 at the intake end, at least the full-load path 9 is activated for controlling the fresh gas stream, in particular in such a way that the full-load path 9 is permanently opened to the max during an intake stroke of the respective piston. Essentially the control unit 13 can also activate the partial-load path 10 for controlling a fresh gas substream via the controller 23 in full-load operation, namely in such a way that the partial-load path 10 is maximally opened permanently at full load at least during an intake stroke of the respective piston. Essentially, however, the partial-load path 10 can be blocked at full load.

Figure 2:
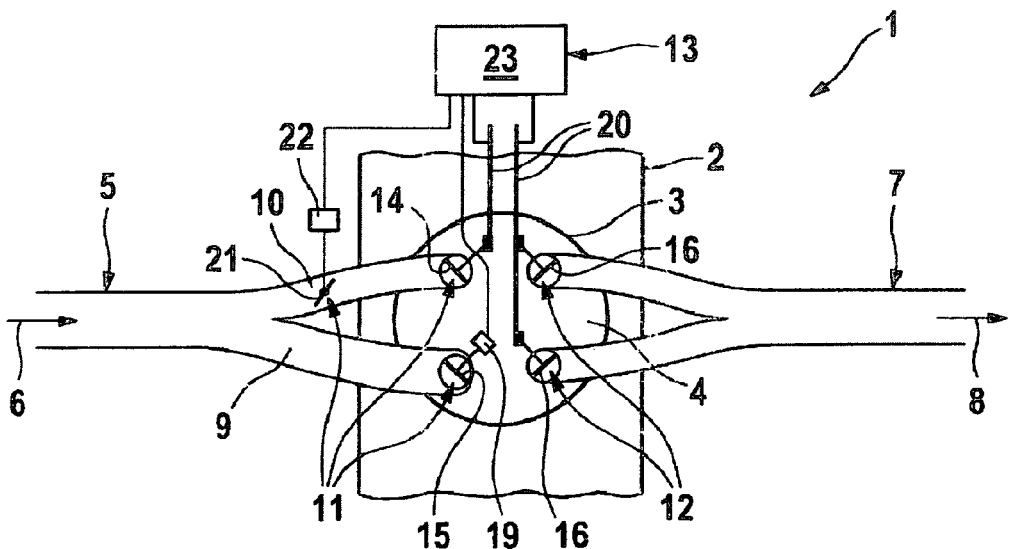
FIG. 2 is a highly simplified basic diagram resembling a wiring diagram of a partial area of a second embodiment of a piston engine.

In the embodiments shown in FIGS. 1 through 3, the valve arrangement 11 on the intake end has a partial-load intake valve 14 allocated exclusively to the partial-load path 10 and a full-load intake valve 15 allocated exclusively to the full-load path 9. By analogy with that, the valve arrangement 12 on the outlet end also has two outlet valves 16 which are preferably always operated in synchronization.

In contrast with that, FIG. 4 shows an embodiment in which the valve arrangements 11, 12 each have only one valve at the intake end and at the outlet end, namely an intake valve 17 and an outlet valve 18.

In the embodiment shown in FIG. 1, the two intake valves 14, 15 can be controlled independently of one another and arbitrarily and/or can be operated to open and close. The outlet valves 16 are arbitrarily operable here as an example. Corresponding actuators are labeled as 19 and are connected to the controller 23 in a suitable manner. For example, the actuators 19 may be electromagnetic servo drives.

The controller 23 is designed so that it permanently blocks the full-load intake valve 15 at partial load, whereas it activates the partial-load intake valve 14 to control the required fresh gas stream. The respective fresh gas stream can be controlled by selecting the opening point in time and the closing point in time for the partial-load intake valve 14. Likewise, the quality of fresh gas supplied can be adjusted by varying the opening stroke of the partial-load intake valve 14. In addition, for implementation of certain desired dynamic flow effects, it may be necessary to implement two or more charging phases by repeated opening and closing of the partial-load intake valve 14 during the charging of the combustion chamber 4.

To implement the desired charging of the combustion chamber 4 at full load, the control unit 13 is designed so that it controls the required fresh gas stream through appropriate activation of the full-load intake valve 15 via the controller 23. Since the maximum available quantity of fresh gas should usually be supplied at full load, the control of the fresh gas stream is preferably reduced essentially to the fact that the full-load intake valve 15 is permanently maximally opened during the intake stroke of the piston. For full-load operation, the partial-load intake valve 14 may also be opened permanently and maximally, especially during the intake stroke. With a corresponding design of the full-load path 9, however, this is not absolutely necessary.

Whereas the intake valves 14, 15 are arbitrarily controllable independently of one another, the outlet valves 16 are expediently operated in synchronization. Arbitrary activation of the outlet valves 16 is not absolutely essential here. Accordingly FIGS. 2 through 4 show embodiments in which the outlet valves 16 are force controlled, e.g., are operable by means of camshafts 20. Outlet valves 16, 18 controlled by camshafts 20 can be implemented much less expensively.

With the embodiment shown in FIG. 2, the partial-load path 10 upstream from the partial-load intake valve 14 contains a partial-load extra valve 21 that is adjustable at least between an open position and a closed position. The partial-load extra valve 21 is connected to a corresponding actuator 22 which is in turn connected to the controller 23. The actuator may be a high-speed adjusting device, for example, that makes it possible to switch the partial-load extra valve 21 between two end positions in less than 5 ms, for example. The partial-load extra valve 21 is arbitrarily operable. In contrast with that, in this embodiment the partial-load intake valve 14 is force controlled by means of a camshaft 20, for example. Such a valve drive can be implemented much less expensively than the electromagnetic actuator 19 from FIG. 1. In the embodiment according to FIG. 1, the full-load intake valve 15 is still arbitrarily operable, in particular by means of an electromagnetic actuator 19.

The partial-load extra load 21 may be designed comparatively inexpensive because it must preferably be adjustable only between a blocked position and an open position. No intermediate positions or throttled positions are required.

The control unit 13 in this embodiment is designed so that at the start of an intake stroke of the piston allocated to the particular cylinder 3, it opens at partial load of the partial-load intake valve 14 and closes at the end of this intake stroke. This is achieved by means of the camshaft 20, i.e., by means of a forced control which is coupled to the movement of the piston. The control unit 13 actuates the actuator 19 of the full-load intake valve 15 via the controller 23 to permanently close the full-load path 9. The fresh gas stream can be implemented for corresponding actuation of the actuator 22, i.e., by action of the partial-load extra valve 21. The desired fluid-dynamic effects can be implemented through opening points in time and closing points in time of the partial-load extra valve 21, which can be adjusted in a targeted manner, in particular through multiphase charging operations. At full load, the control unit 13 actuates the full-load intake valve 15 via its controller 23 for opening the full-load path 9 during the respective intake stroke.

With the embodiment shown in FIG. 3, an additional valve, namely a full-load extra valve 24 which is operable via a corresponding actuator 25 is also arranged in the full-load path 9 upstream from the full-load intake valve 15. The full-load intake valve 15 may then be actuated economically by means of a forced control, e.g., via a camshaft 20.

The camshaft 20 and the actuators 19, 22, 25 form parts of the control unit 13, as does the controller 23 which is connected to the actuators 19, 22, 25.

In the embodiment shown in FIG. 3, the control unit 13 is designed so that it opens the two intake valves 14, 15 at the start of the intake stroke of the respective piston and closes them at the end of the intake stroke in both partial load and full-load via the respective forced control (e.g., the camshaft 20). In partial load, the full-load extra valve 24 is controlled by the controller 23 to close permanently. The fresh gas stream is then adjusted via corresponding actuations of the partial-load extra valve 21. For full-load operation, the controller 23 actuates the full-load extra valve 24 to open, whereby it may be opened maximally and permanently in particularly. At full load, essentially the partial-load extra valve 21 may also be opened, in particular permanently and completely.

The embodiment shown in FIG. 4 differs from the embodiment shown in FIG. 3 only in that a shared intake valve 17 is allocated to the gas paths 9, 10. The actuation of the additional valves 21, 24 is accomplished for partial load and full-load by analogy with the embodiment shown in FIG. 3.

The fresh gas system 5 is preferably designed to be throttle-free, i.e., the fresh gas system 5 does not contain any throttle device for throttling the fresh gas stream upstream from the intake valves 14, 15, 17 and/or upstream from the additional valves 21, 24. In other words, the fresh gas system 5 is designed to be dethrottled.

In partial-load operation, the fresh gas stream is preferably controlled in the embodiments according to FIGS. 2 through 4 so that the partial-load extra valve 21 is adjusted exclusively between its closed position and its open position. In this way, one or more charging phases are implemented during the intake stroke of the respective piston so that dynamic flow effects may be utilized to improve the combustion process. At full load, the partial-load extra valve 21 is expediently opened permanently so that a portion of the fresh gas 6 supplied to the respective combustion chamber 4 goes through the partial-load path 10 into the respective combustion chamber 4. In addition, in the embodiments according to FIGS. 3 and 4, the full-load extra valve 24 and in particular the partial-load extra valve 21 may also be opened permanently at full load so that the fresh gas stream is controlled exclusively by the opening and closing of the intake valve 17 and/or the intake valves 14, 15.

In comparison with the partial-load extra valve 21, the full-load extra valve 24 may essentially be designed to be comparatively slow; in particular the switching times of the full-load extra valve 24 may be longer than the switching times of the intake valves 14, 15, 17. In contrast with that, the switching times of the partial-load extra valve 21 may be shorter than the switching times of the intake valves 14, 15, 17.

In a particularly advantageous embodiment, the control unit 13 may control the partial-load extra valve 21 in partial-load operation via its controller 23 and the respective actuator 22 so that intake phases or charging phases for the respective combustion chamber 4 can be implemented at different points in time during the intake stroke 3. For example, it is conceivable to have an initial charging phase that comprises the opening of the respective intake valve 14, 15, 17, a final charging phase which comprises the closing of the respective intake valve 14, 15, 17 and a middle charging phase between the two other charging phases.

In another embodiment, the full-load extra valve 24 may be equipped with a high-speed servo drive as the actuator 25 to implement extremely short switching times. With such an embodiment, the control unit 13 may control the full-load extra valve 24 via its controller 23 to implement pulse charging of the respective combustion chamber 4.

The invention claimed is:

1. A piston engine, in particular in a motor vehicle, comprising:
   (a) a plurality of cylinders;
   (b) a plurality of combustion chambers;
   (c) a fresh gas system;
   (d) a valve arrangement comprising a partial-load intake valve, a partial-load extra valve, a full-load intake valve, and a full-load extra valve; and
   (e) a control unit;
   wherein each cylinder of the plurality of cylinders has a combustion chamber of the plurality of combustion chambers;
   wherein each combustion chamber of each cylinder of the plurality of cylinders is connected to the fresh gas system;
   wherein the fresh gas system has a full-load path and a partial-load path for at least one cylinder of the plurality of cylinders;

wherein said full-load path and said partial-load path can supply fresh gas to the at least one cylinder of the plurality of cylinders;

wherein the valve arrangement is provided at an intake end of the piston engine, said valve arrangement being provided for controlling the fresh gas stream through the full-load path and the partial-load path into the at least one cylinder of the plurality of cylinders;

wherein the control unit actuates the valve arrangement;

wherein at a partial load the control unit closes the full-load path using the valve arrangement so that fresh gas from the fresh gas stream streams through the partial-load path;

wherein at a full load the control unit controls the valve arrangement to cause fresh gas from the fresh gas stream to stream through the full-load path; and wherein the partial-load extra valve is designed so that shorter switching times can be implemented with the partial-load extra valve than with the full-load extra valve and/or the partial-load extra valve is designed so that shorter switching times can be implemented with the partial-load extra valve than with the partial-load intake valve or the full-load intake valve.

2. The piston engine according to claim 1, wherein the valve arrangement has a partial-load intake valve allocated only to the partial-load path, the partial-load extra valve is allocated only to the partial-load path and is situated upstream from the partial-load intake valve, the full-load intake valve is allocated only to the full-load path, and the full-load extra valve is arranged upstream from the full-load intake valve and is allocated only to the full-load path;

wherein the control unit is designed so that at a partial load the control unit actuates at least the partial-load intake valve at the start of an intake stroke of a piston allocated to the at least one cylinder to open the partial-load path, at the end of the intake stroke the control unit actuates at least the partial-load intake valve to block the partial-load path, the control unit actuates the full-load extra valve to permanently close the full-load path; and the control unit actuates the partial-load extra valve to control the fresh gas stream through the partial-load path; and wherein at full load the control unit actuates at least the full-load intake valve at the start of the intake stroke to open the full-load path, and at the end of the intake stroke the control unit actuates the full-load intake valve to block the full-load path and actuates at least the full-load extra valve to control the fresh gas stream through the full-load path.

3. The piston engine according to claim 1, wherein the full-load path has a larger cross section through which the flow can pass than does the partial-load path and/or the fresh gas system is designed to be throttle-free.

4. The piston engine according to claim 1, wherein the control unit is designed so that the control unit controls the full-load extra valve or the partial-load extra valve, respectively, exclusively to switch between a blocked position and an open position for controlling the fresh gas stream through the full-load path or the partial-load path, respectively; and/or wherein the control unit is designed so that the control unit controls the valve arrangement at full load so that a portion of the fresh gas supplied to the combustion chamber of the at least one cylinder (4) is supplied via the partial-load path; and/or wherein the control unit is designed so that at full load the control unit actuates at least the full-load extra valve to permanently open the full-load path and controls the fresh gas stream through at least one of the full-load gas path and the partial-load gas path by the opening and closing of the full-load intake valve and the partial-load intake valve.

5. The piston engine according to claim 1, wherein the control unit is designed so that the control unit implements three intake phases for the fresh gas stream spaced a distance apart from one another in time by actuation of the partial-load extra valve when the partial-load intake valve is opened; and/or wherein the control unit is designed so that at full load, the full-load extra valve and the full-load intake valve are controlled only for implementing a pulsed charging.

6. A piston engine, in particular in a motor vehicle, comprising:
(a) a plurality of cylinders;
(b) a plurality of combustion chambers;
(c) a fresh gas system;
(d) a valve arrangement comprising a partial-load intake valve, a partial-load extra valve, a full-load intake valve, and a full-load extra valve; and
(e) a control unit;

wherein each cylinder of the plurality of cylinders has a combustion chamber of the plurality of combustion chambers;

wherein each combustion chamber of each cylinder of the plurality of cylinders is connected to the fresh gas system;

wherein the fresh gas system has a full-load path and a partial-load path for at least one cylinder of the plurality of cylinders;

wherein said full-load path and said partial-load path can supply fresh gas to the at least one cylinder of the plurality of cylinders;

wherein the valve arrangement is provided at an intake end of the piston engine, said valve arrangement being provided for controlling the fresh gas stream through the full-load path and the partial-load path into the at least one cylinder of the plurality of cylinders;

wherein the control unit actuates the valve arrangement;

wherein at a partial load the control unit closes the full-load path using the valve arrangement so that fresh gas from the fresh gas stream streams through the partial-load path;

wherein at a full load the control unit controls the valve arrangement to cause fresh gas from the fresh gas stream to stream through the full-load path;

wherein the valve arrangement has a partial-load intake valve allocated only to the partial-load path, the partial-load extra valve is allocated only to the partial-load path and is situated upstream from the partial-load intake valve, the full-load intake valve is allocated only to the full-load path, and the full-load extra valve is arranged upstream from the full-load intake valve and is allocated only to the full-load path;

wherein the control unit is designed so that at a partial load the control unit actuates at least the partial-load intake valve at the start of an intake stroke of a piston allocated to the at least one cylinder to open the partial-load path, at the end of the intake stroke the control unit actuates at least the partial-load intake valve to block the partial-load path, the control unit actuates the full-load extra valve to permanently close the full-load path; and the control unit actuates the partial-load extra valve to control the fresh gas stream through the partial-load path by adjusting the partial-load extra valve exclusively between a closed position and an open position to implement one or more charging phases during the intake stroke of the piston allocated to the at least one cylinder; and wherein at full load the control unit actuates at least the full-load intake valve at the start of the intake stroke to open the full-load path, and at the end of the intake stroke the control unit actuates the full-load intake valve to block the full-load path and actuates at least the full-load extra valve to control the fresh gas stream through the full-load path.

* * * * *